C. REICHMANN.

Lamp.

No. 3,082.

Reissued Aug. 11, 1868.

Witnesses
A. M. James
J. C. Klink

Inventor
R. S. Merrill and
Williams Carleton
by A. Rollo
Atty

N. PETERS, Photo-Lithographer, Washington, D. C.

UNITED STATES PATENT OFFICE.

RUFUS SPAULDING MERRILL AND WILLIAM CARLETON, OF BOSTON, MASS., ASSIGNEES OF CHRISTIAN REICHMANN, OF PHILADELPHIA, PA.

IMPROVEMENT IN LAMPS.

Specification forming part of Letters Patent No. 21,576, dated September 21, 1858; Reissue No. 3,082, dated August 11, 1868.

*To all whom it may concern:*

Be it known that CHRISTIAN REICHMANN, of Philadelphia, in the county of Philadelphia and State of Pennsylvania, has invented certain new and useful Improvements in Lamps for burning kerosene, benzine, and other hydrocarbon fluids; and the following is hereby declared to be a full, clear, and exact description of the same, reference being had to the accompanying drawings, in which—

Figure 2:
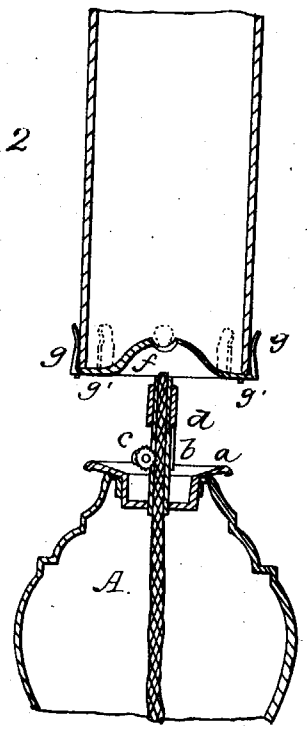
Figure 3:
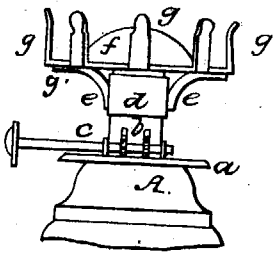
Figure 1:
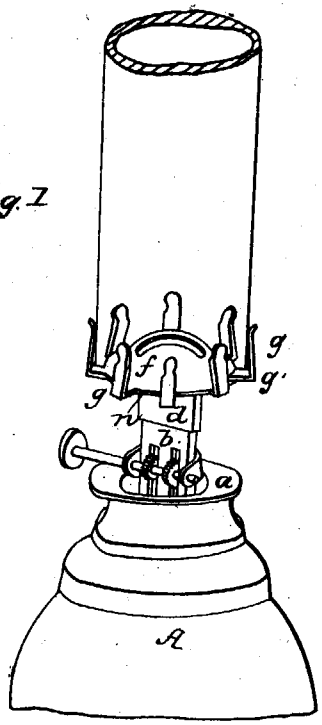

Figure 1 represents a perspective view of the upper part of a lamp provided with a burner constructed in accordance with this invention. Fig. 2 represents a vertical central section of the same, and Fig. 3 represents the method of mounting the cone or deflector upon the wick-tube.

The improvements which are comprised in the present invention relate to burners for hydrocarbon fluids; the object of the said improvements being to produce a burner which shall be safer for every-day use and more easily and readily manipulated, and at the same time give more light, than ordinary burners employed for like purposes.

To enable others skilled in the art to understand and use this invention, the manner in which the same is or may be carried into effect will now be described by reference to the accompanying drawings, in which similar letters of reference, where they occur in the separate figures, denote like parts of the burner.

A represents the lamp, to the top of which is applied a burner, whose base *a* is of any ordinary or suitable construction. The base supports the flat wick-tube *b*, which extends upward some distance above the base, and carries the ordinary wick-adjusting pinions and shaft *c*.

Upon the upper end of the tube there is a friction-sleeve, *d*, from whose opposite sides extend two arms or supports, *e*, upon which the dome or deflector *f* is supported, being soldered or otherwise suitably secured thereto. The deflector may be of any ordinary or suitable form, slotted to admit the passage of the flame, and open at the base or bottom. It is raised a considerable distance above the base of the burner, as will be clearly seen by reference to the drawings, and has no direct connection with the base.

It has been found, in practice, that the arms or other suitable dome-supporting frame may be attached to the wick-tube directly, instead of through the medium of the sleeve, which, in such case, can be dispensed with. But under this arrangement the dome, while permanently joined to the tube, will be held, as before, in an elevated position above the base.

In a burner thus constructed three things are especially noticeable:

First, the deflector and wick-tube are so combined that while directly connected—*i. e.*, by means of the arms or frame *e*—light passes out, or is reflected downward from between them.

Second, that part of the burner most liable to become highly heated is islolated or removed from contact with the base of the burner. The base of the burner, therefore, which forms the cap or cover for the fluid-reservoir in the lamp, is at all times quite cool, and can be readily handled without trouble; moreover, the fluid which exudes from the wick, and gathers in and around the base, is prevented from becoming heated and vaporized—a frequent source of explosions of lamps of this kind being thus removed. The burner shown in the drawings may be considered as composed of two distinct sections or groups of elements connected through the medium of the wick-tube. When the lamp is lighted, the deflector and other parts adjoining the flame necessarily become much heated, but the only medium for the communication of this heat to the base is the wick-tube, the heat of which is dissipated and carried off by the surrounding air before it can reach the base.

Third, the deflector and other parts surrounding or covering the wick-tube are made adjustable with relation to the said tube, and can without difficulty be applied to or removed from the same.

Under the two preceding features of the invention, it is not necessary that the upper portion or section of the burner should be made adjustable with respect to the wick-tube, but by mounting the deflector or the deflector and chimney-rest upon a friction-sleeve fitting the tube the parts can be manipulated with great ease, and there is no need of detaching the chimney and deflector separately in order to trim the wick, which at any time can be exposed to view by slipping off the sleeve from the tube. The deflector in this manner can be adjusted upon or removed from the wick-tube, as desired, while the wick may be readily lighted through the open base of the dome.

It is needless to say that the deflector can, if desired, be used with the ordinary chimney rest or holder, the latter being in this case attached to the arms. The sleeve acts, also, as a guide to direct the deflector, so that its oblong slot or opening shall lie in the same vertical plane as the flat wick-tube.

A further feature of this invention consists in forming around the base of the dome a series of peripheral springs, which serve to support and steady the lamp-chimney. These springs *g* are represented plainly in the different figures of the drawing. As shown in Fig. 2, they are formed in one piece, with the dome extending out from the base of the same. The arms of which the springs are composed are struck out from the metal which forms the dome, and are turned or bent up so as to form springs for holding and steadying the chimney in its proper position.

That portion *g'* of the arms which is not bent upward is used as the seat on which the base of the chimney can rest. The intervals *h* between the springs or arms form air-spaces, through which, when the chimney is in position, the necessary supply of external air passes up within the chimney, as indicated by the arrows, Fig. 3.

Having now described this invention, and the manner in which the same is or may be carried into effect, we do not wish to be understood as limiting ourselves to the precise construction and arrangement of the parts of the burner as herein described, for it is apparent that the same may be varied in many respects without departing from the principle of the invention; but

What is claimed as the invention of the said REICHMANN is as follows:

1. The combination of a flat wick-tube with a dome or deflector having a corresponding oblong opening or slot under the arrangement, substantially as shown and described, so that, while directly connected with each other, the said parts shall allow light to pass out or be reflected from between them, as set forth.

2. The combination of a flat wick-tube with a slotted dome or deflector, and arms or frame, whereby the said dome is held on the wick-tube in an elevated position in relation thereto, substantially as and for the purposes shown and described.

3. The combination of the deflector, and its supporting arms or frame, and sleeve, with the wick-tube, substantially as and for the purposes set forth.

4. A lamp-burner composed of two groups of elements—the first consisting of the base with its wick-tube and wick-adjusting rack and pinions; the second, of a chimney-holder, deflector, and such other parts as may be needed for the proper combustion of the fluid, so as to produce an illuminating-flame; the two groups being united by friction, and the latter, when in position in the burner, being supported by the former without the intervention of any mechanical device, whereby the two may be rigidly connected together, substantially as and for the purposes herein shown and set forth.

5. The combination, with a flat wick-tube, of a correspondingly slotted but elevated dome, provided with peripheral springs for holding the chimney in proper position, as set forth.

6. The combination, with the base and flat wick-tube, of a chimney rest or holder, an elevated dome provided with peripheral springs, and a sleeve and frame or arms for holding said dome in position with respect to the wick-tube, substantially as and for the purposes herein shown and described.

7. The combination, with the dome or deflector, of a series of arms projecting from the periphery of said deflector, and arranged, as herein described, so as to constitute both the seat or rest for the lamp-chimney and the springs by which the said chimney is steadied and held in position, substantially as set forth.

In testimony whereof we have signed our names to this specification before two subscribing witnesses.

RUFUS SPAULDING MERRILL.
WILLIAM CARLETON.

Witnesses:
LUTHER FARWELL WHITNEY,
ELIPHAZ WESTON ARNOLD.